UNITED STATES PATENT OFFICE.

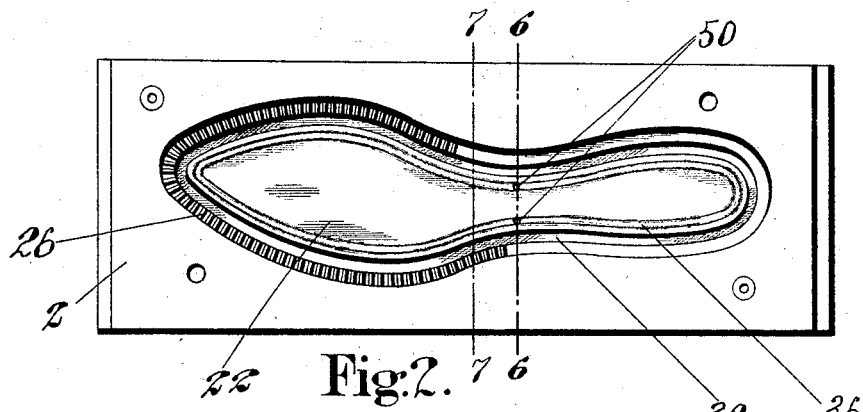
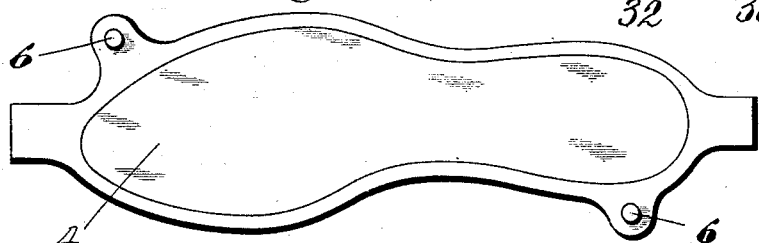
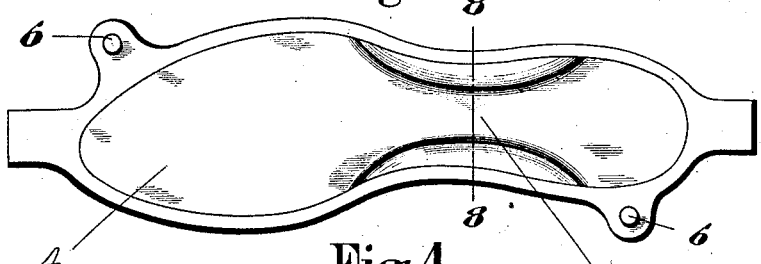
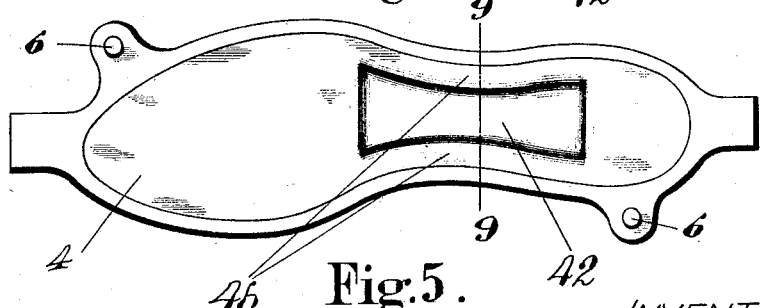

GEORGE FERGUSON, OF WOLLASTON, MASSACHUSETTS, ASSIGNOR, BY MESNE ASSIGN-
MENTS, TO UNITED SHOE MACHINERY CORPORATION, OF PATERSON, NEW JERSEY,
A CORPORATION OF NEW JERSEY.

APPARATUS FOR PRODUCING RUBBER SOLES.

1,406,358. Specification of Letters Patent. Patented Feb. 14, 1922.

Application filed August 25, 1917. Serial No. 188,174.

*To all whom it may concern:*

Be it known that I, GEORGE FERGUSON, a citizen of the United States, residing at Wollaston, in the county of Norfolk and State of Massachusetts, have invented certain Improvements in Apparatus for Producing Rubber Soles, of which the following description, in connection with the accompanying drawings, is a specification, like reference characters on the drawings indicating like parts in the several figures.

This invention relates to apparatus for use in the production of soles for shoes and more especially it concerns improvements in apparatus for producing soles of the manufactured type consisting of composite material molded into an integral sole structure. For the purpose of illustration the invention is herein shown as embodied in an apparatus for producing vulcanized compound rubber soles suitable for use in the manufacture of "turn" shoes, although it is not intended to limit the invention thereby. A sole of the general type herein illustrated constitutes the subject-matter of Patent No. 1,286,176 upon an application filed in my name on Sept. 29, 1916.

It is an object of this invention to provide an improved apparatus constructed and arranged to produce a composite sole structure having a sewing rib in such manner that the sewing rib will provide the required strength to receive the inseam stitches and enable the shoe upper to be sewed to the sole with the greatest facility and to the best advantage. A further object of the invention is to provide an apparatus which will produce the desired shape and finished appearance for the sole without further operation thereon.

With these objects in view an important feature of the invention consists in the combination with a pressure applying mechanism, of co-operating molds constructed and arranged to present, when being acted upon by the pressure applying mechanism, a cavity of the area and thickness of a shoe sole, the molding surfaces of said cavity being shaped to produce a composite molded sole having a sewing rib extending along the margin of the upper surface of the sole, a feather extending outwardly from the base of the sewing rib with its surface provided with a series of transverse ribs, and a gutter adjacent to the inner wall of the rib and separating the interior portion of the sole and the sewing rib, the said gutter providing clearance for the sewing needle in the operation of attaching the shoe upper to the sole.

As herein illustrated the composite sole produced by the apparatus of the invention consists of a sole-shaped body portion of rubber compound and an upper layer of canvas vulcanized to the upper surface of the rubber body and extending on to the margin of the rubber body so that it contributes to the sewing rib formed along the upper marginal surface of the sole. This canvas layer serves to reinforce the rubber body and, also, to strengthen the sewing rib in order that it may securely hold the upper attaching or inseam stitches. An important function of the serrated marginal surface provided by one of the co-operating molds of the apparatus is to indent the margin of the fabric outside of the sewing rib where it extends on to the feather of the sole into the underlying rubber body thereby insuring proper vulcanization of the fabric with the rubber body and so increasing the area of vulcanization between the two materials that the vulcanization, which is in the nature of a "reinforce" vulcanization, strengthens the sewing rib against the penetration of the needle in the inseaming operation. An additional function of the serrations provided in the apparatus is to break up the feather surface of the sole in such manner as to conceal the presence of the fabric on the feather of the sole.

Another important feature of the invention consists in the combination with a pressure applying mechanism, of a sole receiving plate formed and arranged to present a cavity of the area and thickness of a sole and having along the margin of the cavity an upwardly slanting face, between the outer termination of which and the side wall of the cavity is a parallelly extending groove bounded by a marginal face, and a pressure plate co-operating with the sole receiving plate and having a face to complete the sole shaped cavity. With plates formed in accordance with this feature of the invention, a sole may be produced having an adequate sewing rib presenting a minimum projection above its upper or foot receiving surface. The sole receiving plate may have transverse ribs on its marginal face and, in case the fabric constituting the sewing rib extends on to the feather of the sole as in the illustrated sole, then the ribs will indent the fabric into the rubber and insure extended vulcanization thereof; also, by breaking up the surface of the feather, will render the presence of the fabric on the feather invisible.

In accordance with a further feature of the invention, the co-operating plate which acts upon the tread surface of the sole being produced has a surface presenting in transverse section a concavity extending from substantially the heel seat location forwardly to the location at the ball line. Thus a transversely convexed contour is provided for the tread face of the shank portion of the sole which may be reversely contoured during the process of sewing a turn shoe and in the completed shoe return to the desired convexed contour.

Other objects and features of the invention will appear from the following detailed description considered in connection with the accompanying drawings and the invention will be defined in the appended claims.

In the drawings:

Fig. 2 is a plan view of the sole receiving plate.

Fig. 3 is a plan view of the pressure plate.

Fig. 4 is a plan view of a modified form of the pressure plate.

Fig. 5 is a plan view of another form of the pressure plate.

Figure 1:
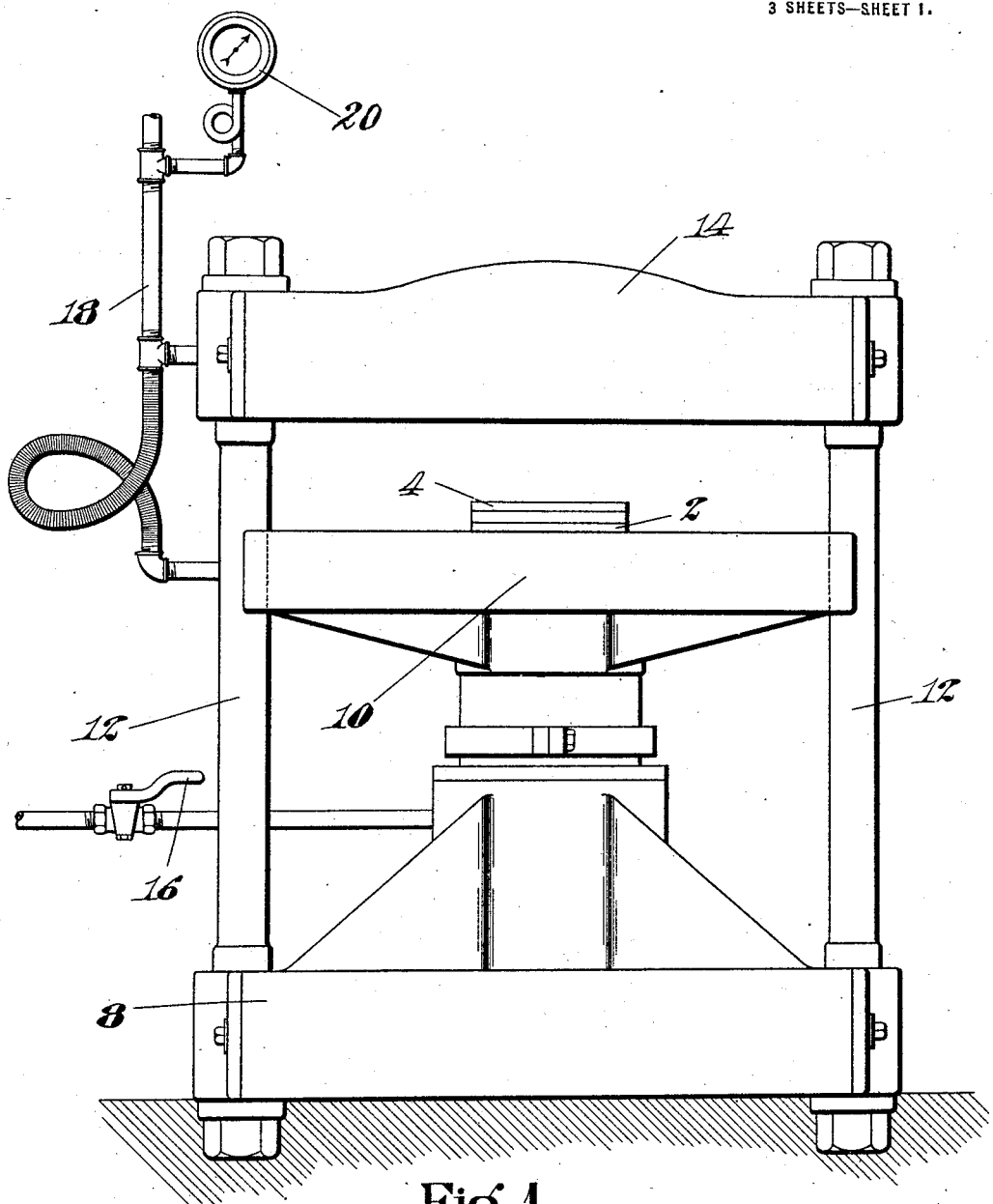
Fig. 1 is a side elevation of the apparatus of the invention in its preferred form.

In the drawings, 2 represents a stock receiving plate having a cavity adapted to receive a sole-shaped body of semi-plastic material and 4 represents a pressure plate adapted to co-operate with the stock receiving plate 2. These plates when alined by means of the dowels 6 present a cavity of the area and thickness of a shoe sole and are actuated to produce the sole by an apparatus of suitable construction to apply pressure to the stock receiving plate 2 and pressure plate 4 and also to heat the said plates sufficiently to effect vulcanization of the semi-plastic material constituting the sole, a suitable machine for this purpose being indicated in Fig. 1 of the drawings. As herein shown the pressure applying mechanism comprises a bed 8 supporting a vertically reciprocable pressure table 10 which is guided for pressure applying movement by upright guideways 12 secured in the frame 8 and a stationary abutment 14 mounted upon the upper ends of the uprights 12. The stock receiving plate 2 and the pressure plate 4 are replaceably mounted upon the pressure table 10 and are subjected to a pressure between the table 10 and the stationary abutment 14 by a hydraulic mechanism indicated at 16 and operating to move the table 10 upwardly into pressure applying relation to the abutment 14. The co-operating plates 2 and 4 are heated to a degree sufficient to cause vulcanization of the sole by means of steam pipes 18 which admit steam to chambers provided in the pressure table 10 and the stationary abutment 14, a gage 20 indicating the degree of heat being used.

In the illustrated embodiment of the invention the stock receiving plate 2 has a cavity 22 of the shape of the sole to be produced and of a depth corresponding substantially to the thickness of the sole to be produced whereby the overflow of excess material confined by the plates is excluded along the lower tread edge of the sole when the plates are subjected to pressure so that the fin remaining on the sole may readily be removed.

As above stated, the apparatus has provision for imparting stiffness to the feather of the rubber sole. As herein shown, the cavity 22 in the plate 2 has a substantially flat marginal face or shaft extending around the edge of the cavity adjacent to the vertical outer wall 24 of the cavity and of a width corresponding to the extending or feather portion of a sole. This marginal face is provided with a series of grooves 26 disposed transversely thereof, that is, at substantially right angles to the periphery of the cavity and terminating along substantially the inner edge of the marginal face. These grooves 26 are preferably of a depth and width to form a series of alternate ribs and grooves along the margin of the sole sufficient to stiffen the margin of the sole and render it less flexible and resilient than other portions of the sole, the alternate rib and groove formation which is provided on the sole by the grooves 26 being shown in Fig. 10. The grooves preferably extend from the shank portion of the cavity 22 around the forepart of the cavity to the shank portion on the opposite side of the cavity. In practice the portion of the sole about the heel end of the shoe has little if any extension beyond the sides of the upper so that there is no necessity for stiffening this portion of the sole.

Figure 10:
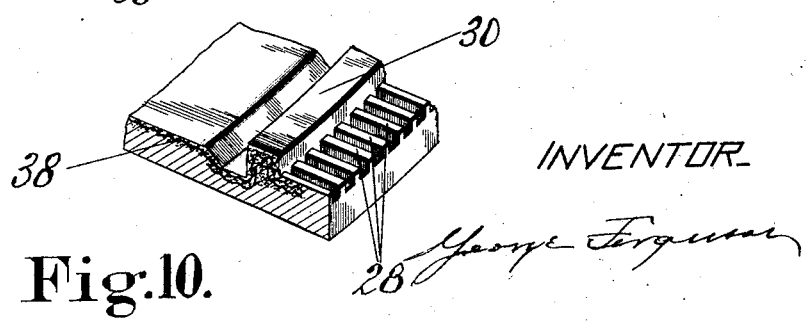
Fig. 10 is a detailed perspective of a portion of a sole produced by the use of the apparatus shown in the drawings.

As illustrated in Fig. 10, the forming grooves 26 are substantially rectangular in cross section and are of the same dimensions throughout. The rubber soles heretofore provided have necessarily been restricted in their use to the types of shoes in which a welt is employed, the welt serving as a backing for the unsupported margin of the sole. With a sole having stiffening ribs and grooves as indicated by 28 on the sole illustrated in Fig. 10, and formed by the apparatus of the invention, the substantially firm and inflexible marginal portion enables the sole to be incorporated in shoes of the type in which there is no welt provided, for example, shoes of the McKay type. If desirable, a marginal lamina of fabric may be applied to the upper surface of the body 2 of the sole in which case the grooves 26 formed on the marginal face in the cavity 22 operate to embed and to corrugate the margin of the fabric in the rubber body of the sole so that a further strengthening of the marginal edge is secured in addition to the integral stiffening ribs formed from the sole material. The alternate grooves and ribs 26 associated with the plate 2 also serve to effect a reinforcing or strengthening of the vulcanized connection between the fabric and the rubber body and conceal the presence of the fabric which extends on to the upper surface of the margin.

The stock receiving plate 2 has provision for producing an adequate sewing rib 30 on the sole which will present a minimum projection above its upper or foot engaging surface. As illustrated, this provision comprises a straight walled groove 32 formed in the cavity 22 of the plate 2 and extending parallel to the upright wall 24 of the cavity, the groove being bounded along its outer edge by the marginal face having the alternate ribs and grooves 26. For the purpose of producing a sewing rib having a minimum projection above the upper surface of the sole and also to enable an inseam to be located as closely as possible to the upper surface of the sole, the surface 36 of the cavity 22 extending adjacent to the inner wall of the rib forming groove 32 is inclined upwardly and outwardly as indicated. This inclined surface 36 serves to form the base of the sewing rib 30 a substantial distance below the feather surface of the sole that is in a plane below the general plane of the top of the sole so that the needle of the sewing machine may have sufficient clearance when attaching the sole produced to the shoe to prevent it from defacing or otherwise injuring the surface of the sole lying within the projecting sewing rib. When a fabric layer 38, for example, canvas, is incorporated in the sole to be formed into a sewing rib 30, as in the illustrated embodiment of the invention, this inclined surface 36, by reason of its being in a higher plane than other portions of the sole, performs the function of holding the fabric layer in position against the body of sole material during the relative movement of the two plates 2 and 4 into sole forming position whereby the portion of fabric outside of this inclined projecting surface is enabled uniformly to be gathered entirely around the sole into the rib forming groove 32 in the plate 2. When the fabric lamina 38 is provided on the top surface of a sole, its edges are preferably terminated a distance in from the outer edge of the sole as shown in the drawings and the alternate rib and groove formation 26 on the stock receiving plate 2 acts to conceal the presence of the fabric 38 on the exposed upper surface of the sole and, in addition, also corrugates the edge of the fabric in the rubber body, thus insuring the vulcanized union between the two materials. This later function is of considerable importance in the production of a sole of the type illustrated since a considerable strain is applied to the portion of the fabric 38 extending over on to the feather of the sole by the penetration of the sewing needle in securing a shoe upper to the sole and unless the fabric is firmly bonded to the rubber body there is a liability of the sewing rib giving away. In an apparatus arranged to produce soles of the type described, the alternate ribs and grooves 26 preferably terminate at the outer vertical wall of the sewing rib 30, thus insuring well-defined and properly vulcanized angular surfaces to enable the margin of a shoe upper to be drawn in during the use of the sole.

The upper surface of the stock receiving plate 2 presents a substantially flat surface 40 to co-operate with a flat face formed on the pressure plate 4.

Figure 8:
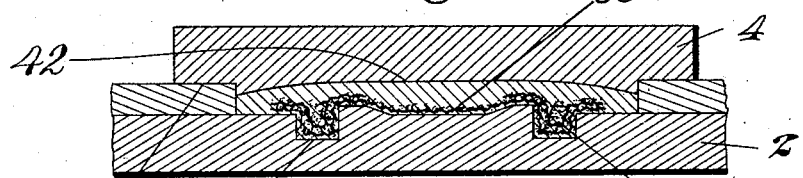
Fig. 8 is a cross section substantially like that of Fig. 6 and taken on the line 8—8 of Fig. 4.
Figure 9:
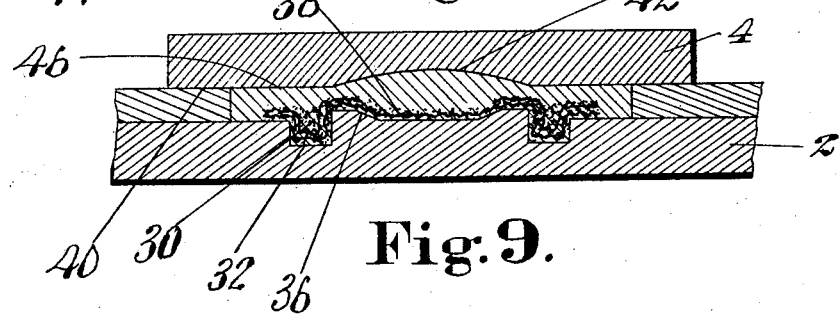
Fig. 9 is a cross section substantially like that of Fig. 8 on the line 9—9 of Fig. 5.

The pressure plate 4 of the apparatus may have a flat acting surface as shown in Fig. 3 of the drawings. Preferably, however, it is provided with a concave surface 42 extending longitudinally of the plate from either side and terminating between substantially the ball line and the heel breast portions of the cavity as shown in Figs. 4 and 5. As indicated in Fig. 8 of the drawings, this concavity 42 extends throughout the entire width of the shank portion of the acting surface of the pressure plate 4 and in order to prevent an extra thickness of the sole throughout the convex portion, the marginal surface 44 of the pressure plate adjacent to the concave surface 42 is recessed to cause the concaved portion of the pressure plate to fit within the cavity 22 of the stock receiving plate when the two plates are in operative relation. This construction of pressure plate, however, is not necessary unless it is desired to eliminate an extra thickness of the sole material through the shank of the sole being produced. Alternatively, the concave surface 42 formed in the pressure plate may be of a width to extend through the central portion of the sole leaving a substantially horizontal marginal surface 46 on either side as indicated in Fig. 9 of the drawings. By reason of the concave surface provided in the pressure plate 4, a convex contour is imparted to the tread or bottom surface of the shank portion of the sole so that when the sole produced is being used, it will return to the desired contour after it has been held in a reversed condition during the attachment of the shoe upper to the sole as in turn shoemaking. Owing to the peculiar properties of a rubber compound sole it is exceedingly difficult to remove any material from the tread of the sole for the purpose of imparting to it a convex contour to the sole and in causing the sole to maintain the shape imparted to it after it is once removed from the last.

The stock receiving plate 2 is further provided with two perpendicularly extending apertures 50 located on either side of the shank portion of the plate adjacent to the rib forming groove 32. These apertures are arranged to receive the legs of a staple and hold it in position to incorporate it in the sole with the legs of the staple projecting from the upper side of the sole for the purpose of securing a shank piece in position in the shoe during the use of the sole.

It will be noted that with an apparatus as above described, a rubber sole may be produced having a firm and substantially rigid or inflexible margin whereby a definite edge contour for the sole may be secured; an adequate sewing rib provided on the upper surface of the sole to enable a shoe upper to be secured to the sole to the best advantage; and a conformation imparted to the shank portion of the sole consistent with the peculiar requirements of shoe making not obtainable with the rubber soles heretofore provided.

Figure 6:
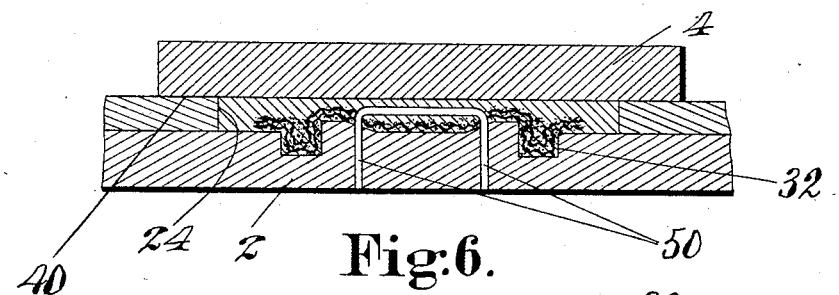
Fig. 6 is a cross section of the co-operating plates with a sole in position therebetween, said section being taken on the line 6—6, Fig. 2, and through the shank portion of a turn shoe rubber sole.
Figure 7:
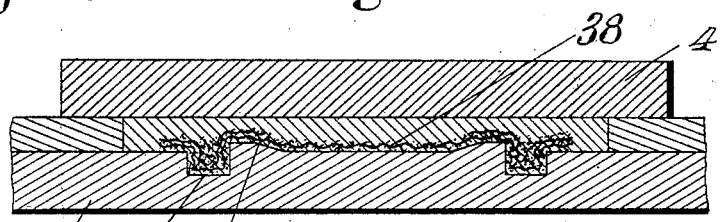
Fig. 7 is a cross section substantially like that shown in Fig. 6 on the line 7—7 of Fig. 2.

In the use of the apparatus above described for producing a rubber sole for turn shoes of the type illustrated, the sheet of fabric 38 is first placed in the cavity 22 of the stock receiving plate 2, the canvas being of such size that its periphery will fall within the wall 24 of the cavity, and preferably also a substantially narrow strip of canvas is laid upon the fabric 38 in position for it to be forced into the rib forming groove 32 in the cavity. A layer of semi-plastic rubber compound is then placed in the cavity 22 upon the two canvas layers and the pressure plate 4 placed in position, the dowel pins 6 alining the pressure plate in proper operative relation to the stock receiving plate 2. The assembled plates 2 and 4 in which the several sole materials are held are then placed upon the table 10 of the pressure applying and heating apparatus where they are subjected to pressure between the stationary abutment 14 and the table 10 through the hydraulic connections 16. By reason of the inclined surfaces 36 in the stock receiving plate 2, which surfaces project above other portions of the bottom wall of the cavity, the canvas layers and the rubber compound are positively clamped together as relative movement between the stock receiving plate and the pressure plate 4 is effected so that the canvas which is forced into the groove 32 in the cavity is uniformly drawn inwardly from the margin of the cavity. Thus it will be noted that substantially no displacement of the canvas can occur during the compressing of the materials whereby a uniform disposition of the canvas upon the upper surface of the sole being produced is insured. The compression of the materials constituting the sole by the stock receiving plate 2 and the pressure plate 4 causes the grooves 26 provided on the surface of the cavity 22 lying between the outer wall 24 and the groove 32 to form a series of alternate rectangular shaped ribs and grooves in the feather portion of the sole as illustrated in Fig. 10. Portions of the canvas layers are also forced into groove 32 to provide a projecting stitch receiving rib on the upper surface of the sole, and the surface 36 of the plate 2 operates to depress the surface of the sole adjacent to the inner wall of the rib below the plane of the upper side of the feather or margin of the sole. A rib produced in this manner enables the inseam which secures the upper to the sole to be located as closely as possible to the upper surface of the sole and the necessity of the sewing rib projecting above the upper surface of the sole to an appreciable extent is avoided. If it is desired to incorporate a shank securing staple in the sole being produced, the legs of the staple are received in the apertures 50 of plate 2 and the bar of the staple located midway between the upper and lower surfaces of the sole as illustrated in Fig. 6. In the use of the pressure plate indicated in Fig. 3, the bottom or tread surface of the sole presents a substantially flat surface. Preferably, however, a pressure plate such as that shown in Figs. 4 or 5 is employed. By using either of these pressure plates the concave surface 42 produces a transversely convex contour on the bottom of the sole whereby the sole is caused to return to this condition after it has been reversely contoured during the use of the sole in the manufacture of a turn shoe. In the use of the plate 4 shown in Fig. 8 the formation of the surface 44 of the plate enables the concave portion 42 to fit within the cavity in the plate 2, thus enabling the convex contour to be formed upon the shank portion of the sole without increasing the thickness of the sole at this portion.

Having described my invention, what I claim as new and desire to secure by Letters Patent of the United States is:—

1. Apparatus for use in the manufacture of turn shoe rubber soles having, in combination, a stock receiving plate recessed to present a cavity to receive the body of the sole and having along the margin of the cavity an upwardly extending face outside of which is a straight walled groove bounded on the outer side by a serrated marginal face, and an upstanding wall surrounding the cavity, said plate having a top face extending entirely around the cavity; and a pressure plate co-operating with the stock receiving plate and having a face to fit said top face of the receiving plate.

2. Apparatus for use in the manufacture of turn shoe rubber soles having, in combination, a stock receiving plate recessed to present a cavity to receive the body of the sole and having along the margin of the cavity a groove bounded on the outer side by a marginal face located in a plane lower than the inner edge of the groove, and an upstanding wall surrounding the cavity, said plate having a top face extending entirely around the cavity; and a pressure plate co-operating with the stock receiving plate and having a face to fit said top face of the receiving plate.

3. Apparatus for use in the manufacture of turn shoe rubber soles having, in combination, a stock receiving plate recessed to present a cavity to receive the body of the sole and having along the margin of the cavity a groove bounded on the outer side by a marginal face located in a plane lower than the inner edge of the groove and an upstanding wall surrounding the cavity, said plate having a top face extending entirely around the cavity; a pressure plate co-operating with the stock receiving plate and having a pressure applying face presenting in transverse section a concavity extending from the rear of the heel breast location forwardly to the front end of the shank; and mechanism for applying pressure and vulcanizing heat through the said plates.

4. Apparatus for use in the manufacture of turn shoe rubber soles having, in combination, a stock receiving plate and a cover plate, said plates being formed relatively to produce a rubber sole having a sewing rib and a feather located on the outer side of the rib, the cover plate having a stock engaging face extending into the stock receiving portion of the co-operating plate along the shank portion of the sole and formed to produce soles having shank edges of less thickness than the forepart edges.

5. Apparatus for use in the manufacture of rubber soles having, in combination, a stock receiving plate 2 having a sole cavity 22 provided in its bottom face with a groove 32, a surface 36 slanting upwardly toward the inner side of the groove, and a margin 26 outside the groove in a plane below the top of the slanting wall; a pressure plate 4, and means for applying pressure and heat through said plates.

6. Apparatus for use in the manufacture of molded soles, comprising in combination, a stock-receiving mold provided with a sole molding cavity having a wall projecting above the floor of the cavity and extending along its margin, a groove extending parallel to and bounding the said wall, and a narrow marginal surface bounding the said groove and disposed in a plane below the top face of the mold, and a pressure plate co-operating with the stock receiving plate to complete the sole forming cavity.

7. Apparatus for use in the manufacture of molded soles comprising a stock-receiving mold provided with sole molding cavity having a shelf projecting inwardly from its outer wall, a groove adjacent the shelf, the inner wall of the groove projecting to a level equal at least to the level of the shelf, and the floor of that portion of the cavity located inside the last-named wall being at a level below the level of the top of the wall to produce a marginally extending rib on the sole, a gutter adjacent to the inner wall of the rib, and a central portion raised above the bottom of the gutter, said mold having a top face extending entirely around the sole forming cavity, and a pressure plate co-operating with the stock-receiving mold.

8. Apparatus for use in the manufacture of rubber soles for turn shoes, having in combination, a stock-receiving plate 2 having a sole cavity 22 provided with a marginal surface 26 arranged to produce a feather for the sole, a groove 32 for forming a sewing rib on the marginal upper surface of the sole, a surface of the cavity 22 within the said groove located in a plane below the top of the inner wall of the said groove, and a surface 36 forming a continuation of the said surface of the cavity to the top of the inner wall of said groove 32, a pressure plate 4, and means for applying pressure through said plates.

9. Apparatus for use in the manufacture of molded soles comprising co-operating mold members constructed and arranged to provide a stock receiving cavity having a shelf projecting inwardly from its outer wall, a groove adjacent to the shelf, the inner wall of the groove projecting to a level equal at least to the level of the shelf, and the floor of that portion of the cavity located inside the last-named wall being at a level below the level of the top of the wall to produce a marginally extending rib on the sole, a gutter adjacent to the inner wall of the rib, and a central portion raised above the bottom of the gutter.

In testimony whereof I have signed my name to this specification.

GEORGE FERGUSON.